3,096,245
16α-METHYLYOHIMBONE, PROCESS THEREFOR
AND THERAPEUTIC COMPOSITIONS THEREOF
John Shavel, Jr., Mendham, and Maximilian von Strandtmann, Morris Plains, N.J., assignors to Warner-Lambert Pharmaceutical Company, Morris Plains, N.J., a corporation of Delaware
No Drawing. Filed Oct. 29, 1959, Ser. No. 849,464
4 Claims. (Cl. 167—67)

The present invention relates to the new and novel compound 16α-methylyohimbone having the formula:

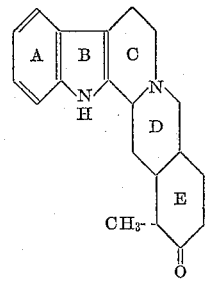

to therapeutic compositions comprising this compound, to methods of producing it and to new and novel intermediates useful in the synthesis of 16α-methylyohimbone.

16α-methylyohimbone is an effective analgesic whose potency is comparable to that of codeine but has the great advantage of not causing sedation. In addition, it is a mild hypotensive agent, a mild tranquilizer and also possesses antitussive properties.

It has now been found that 16α-methylyohimbone may be produced by the dehydrogenation of a compound selected from the group consisting of 16α-methylyohimbol, 16α-methylepiyohimbol, and 16-methylcorynanthol. The configuration of the substituents on ring E of each of the alternate starting compounds is as follows:

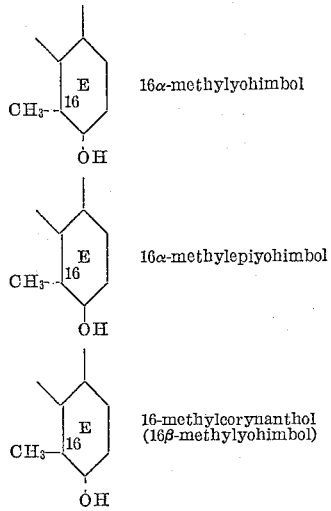

It is a particular feature of the method of the present invention that dehydrogenation of any of these compounds yields 16α-methylyohimbone; thus, the methyl group in the product is obtained in the α-position regardless of the particular configuration of the compound which is dehydrogenated.

The starting material 16α-methylyohimbol is a known compound described by Karrer et al., Helv. Chim. Acta 35, p. 1933 (1952) and is derived from the alkaloid yohimbine:

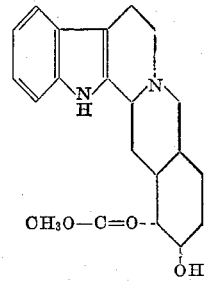

by known procedures.

It has been found that the new compounds 16α-methylepiyohimbol and 16-methylcorynanthol may be prepared from the alkaloids β-yohimbine and corynanthine, respectively. 16α-methylepiyohimbol is obtained by the following sequence of reactions:

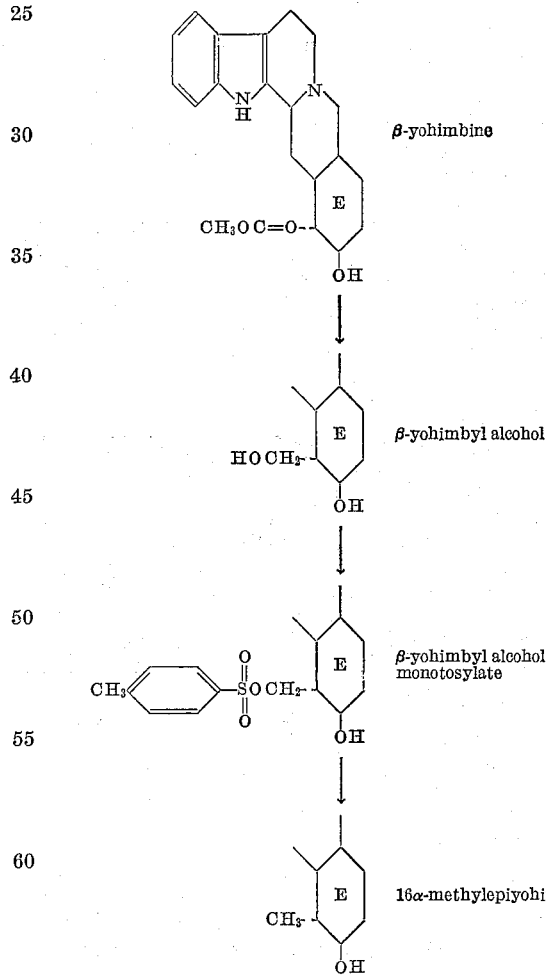

and 16-methylcorynanthol by the sequence:

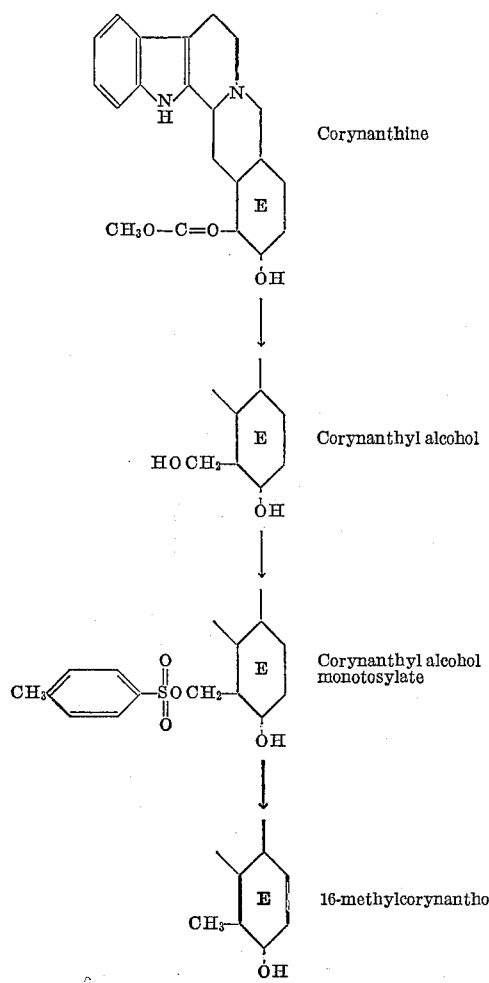

In each reaction sequence, the configuration of the A, B, C and D rings of the yohimbane structure is the same as that of the alkaloid starting materials.

The present invention, therefore, embraces not only the final compound 16α-methylyohimbone, therapeutic compositions comprising it and the method of preparing it from 16α-methylyohimbol, 16α-methylepiyohimbol and 16-methylcorynanthol, but also the method of preparing the new compounds 16α-methylepiyohimbol and 16-methylcorynanthol from the alkaloids β-yohimbine and corynanthine, respectively, and the new intermediates obtained in these syntheses.

The initial step in the conversion of β-yohimbine and corynanthine to 16α-methylepiyohimbol and 16-methylcorynanthol, respectively, is the reduction of the starting materials to form β-yohimbyl alcohol and corynanthyl alcohol, respectively. This reduction reaction may be carried out in the presence of a suitable reducing agent such as the complex metal hydrides, for example lithium aluminum hydride and the like, or alkali metals such as sodium or potassium in the presence of an alcohol such as butanol, amyl alcohol and the like. Where a complex metal hydride is used as the reducing agent, the reaction is carried out in a suitable inert solvent, ethers such as tetrahydrofuran, dioxan and the like being generally preferred. Since the preferred reducing agents are reactive with water, it is essential that the reduction be carried out under strictly anhydrous conditions. It has been found that lithium aluminum hydride is a particularly effective reducing agent for this reaction. The reduction reaction is carried out at room temperature for between 10 and 30 hours, after which water is added in order to destroy any excess of the reducing agent.

After removal of any precipitated inorganic residues resulting from decomposition of the reducing agent, the solution is evaporated to dryness and the product, β-yohimbyl alcohol or corynanthyl alcohol, is purified by crystallization.

The resulting β-yohimbyl alcohol and corynanthyl alcohol, respectively, are then converted to the corresponding monotosylate derivatives by reaction in the cold (10° C. or less) with p-toluenesulfonyl chloride in the presence of pyridine or other tertiary base under anhydrous conditions. The monotosylate is recovered from the reaction mixture by precipitation with ether or other non-polar solvents.

The last step in the reaction sequence is the conversion of the monotosylates obtained to 16α-methylepiyohimbol and 16-methylcorynanthol, respectively, by reduction. The reduction may also be carried out with reducing agents such as the complex metal hydrides, for example lithium aluminum hydride and the like in solution in a suitable solvent such as tetrahydrofuran, dioxan and the like. Alternately, the reduction may be carried out catalytically with hydrogen in the presence of a noble metal catalyst such as platinum, palladium and mixtures thereof. It is essential that strictly anhydrous conditions be maintained during the reduction. At the conclusion of the reaction, the reaction mixture is freed of catalyst or excess reducing agent. Where a noble metal catalyst has been employed, it is removed by filtration. Where a complex metal hydride reducing agent has been used, water is added to the reaction mixture followed by filtration to remove the insoluble inorganic precipitate formed. The filtrate remaining after catalyst removal is evaporated to dryness and the residue is purified by crystallization from organic solvents.

The compounds 16α-methylepiyohimbol and 16-methylcorynanthol obtained as described above not only are valuable as intermediates in the preparation of 16α-methylyohimbone, but as such also are useful as analgesics.

The new and novel 16α-methylyohimbone is prepared by the oxidation of either 16α-methylyohimbol, 16α-methylepiyohimbol or 16-methylcorynanthol. It has been found that oxidation using as a catalyst system an aluminum alkoxide such as aluminum phenoxide, aluminum isopropoxide, aluminum t-butoxide and the like and a ketone such as cyclohexanone, acetone and the like in the presence of a suitable organic solvent such as toluene, xylene and the like is a particularly effective reaction system for carrying out the desired oxidation. The reaction mixture is refluxed for 10 to 30 hours and then filtered. The filtrate is extracted with aqueous base and the organic phase is then extracted with aqueous acid. The product, 16α-methylyohimbone, is precipitated from the acid extract by making the solution basic with ammonia or sodium hydroxide and the precipitate obtained is purified by crystallization.

It is to be understood that the new and novel compounds of this invention may be used as the free base or may be converted into the corresponding pharmaceutically acceptable non-toxic acid addition and quaternary ammonium salts. Exemplary of non-toxic acid addition salts are those formed with maleic, fumaric, benzoic, ascorbic, succinic, bismethylensalicylic, methylsulfonic, ethane-disulfonic, acetic, propionic, tartaric, salicylic, citric, gluconic, lactic, malic, mandelic, cinnamic, citraconic, stearic, palmitic, itaconic, glycolic, benzenesulfonic, hydrochloric, hydrobromic, sulfuric, sulfamic, phosphoric and nitric acids. The acid addition salts may be prepared in the conventional manner, for example, by treating a solution or suspension of the free base in an organic solvent with the desired acid, and then recovering the salt which forms by crystallization techniques. The quaternary salts are prepared by heating a suspension of the base in a suitable solvent with a reactive alkyl halide such as methyl iodide, ethyl bromide, n-hexyl bromide, benzyl chloride or a reactive ester such as methyl sulfate, ethyl sulfate or methyl p-toluene sulfonate.

The new and novel 16α-methylyohimbone as either the free base or in the form of its non-toxic salts as well as the novel intermediates may be formulated with a conventional pharmaceutical carrier and used to form tablets, capsules, elixirs, solutions or suspensions for injection, suppositories and the like. Each dosage unit will normally contain about 2 to about 100 mg. of the active ingredient with a range of 5 to 25 mg. being generally preferred. The daily dosage is normally in the range of 5 to 100 mg.

The following examples are included further to illustrate the present invention:

EXAMPLE I

(a) β-Yohimbyl Alcohol

A solution of 15 g. β-yohimbine in 250 ml. tetrahydrofuran (dried over $LiAlH_4$) is added dropwise to a cooled suspension of 6 g. $LiAlH_4$ in 150 ml. tetrahydrofuran with stirring and under protection from moisture. The mixture is stirred at room temperature for 20 hours. The solution is then filtered and treated with water to decompose any excess of reducing agent. The precipitate is filtered off, extracted several times with hot tetrahydrofuran and discarded. The combined filtrates are dried over anhydrous sodium sulfate and evaporated in vacuo. The distillation residue is recrystallized from methanol-water (95:5). A yield of 12 g. of β-yohimbyl alcohol is obtained. The product has a melting point of 246° C. and an $[\alpha]_D^{25}=-48°$ (pyridine, c.=0.5, l.=1 dm.).

Analysis.—Calc. ($C_{20}H_{26}N_2O_2 \cdot \frac{1}{2}H_2O$): C, 71.60; H, 8.11; N, 8.35. Found: C, 71.48; H, 8.17; N, 8.10.

(b) β-Yohimbyl Alcohol Monotosylate

To a solution of 7 g. β-yohimbyl alcohol in 40 ml. dry pyridine, a solution of 10 g. p-toluenesulfonyl chloride in 30 ml. pyridine and 10 ml. dry ether is added dropwise at 0° with stirring and under protection from moisture. The mixture is allowed to stand at 0° for 4 hours. 500 ml. dry ether are added to the solution and the precipitated material is triturated several times with fresh ether until it becomes granular. The residue is dried in a desiccator in vacuo over $H_2SO_4$. The resulting dry powder is added in portions to 200 ml. 3% ammonia and stirred for 15 minutes. The insolubles are collected on a filter and dried in a vacuum desiccator over $H_2SO_4$. A yield of 8 g. of β-yohimbyl alcohol monotosylate is obtained. The product softens above 128° C. and has an $[\alpha]_D^{25}=0°$ (pyridine, c.=0.4, l.=1 dm.).

(c) 16-Methylepiyohimbol

A solution of 5 g. β-yohimbyl alcohol monotosylate in 250 ml. dry tetrahydrofuran is added dropwise to a suspension of 2 g. $LiAlH_4$ in 150 ml. dry tetrahydrofuran with stirring and under protection from moisture. The mixture is refluxed for 4 hours and allowed to stand over the weekend at room temperature. The solution is filtered and to the filtrate water is added to destroy any excess of reducing agent. The precipitate is filtered off, extracted several times with hot tetrahydrofuran and discarded. The combined filtrates are dried over sodium sulfate and evaporated to dryness in vacuo. The residue is recrystallized several times from acetone. A yield of 1.0 g. 16-methylepiyohimbol is obtained. The product has a melting point of 253–255° C. and an $[\alpha]_D^{25}=-125°$ (pyridine, c.=0.5, l.=1 dm.).

Analysis.—Calc. ($C_{20}H_{26}N_2O$): C, 77.38; H, 8.44; N, 9.02. Found: C, 77.64, 77.41; H, 8.14, 8.39; N, 8.80, 8.74.

(d) 16-Methylyohimbone

A mixture of 0.6 g. 16-methylepiyohimbol, 3 g. aluminum phenoxide, 30 ml. xylene (dried over sodium) and 30 ml. cyclohexanone (dried over sodium sulfate) is refluxed for twenty hours with stirring and under protection from moisture. The hot solution is filtered. The filtrate is washed with 10% sodium hydroxide solution and subsequently extracted six times with 20 ml. portions of 20% acetic acid solution. The combined acid extracts are filtered and the filtrate made basic with ammonia. The precipitated alkaloid is filtered off, washed with water, dried in a vacuum desiccator over $H_2SO_4$ and recrystallized from acetone. A yield of 0.3 g. 16-methylyohimbone is obtained. The product has a melting point of 325–328° C. and an $[\alpha]_D^{25}=-102°$ (pyridine, c.=0.7, l.=1 dm.).

Analysis.—Calc. ($C_{20}H_{24}N_2O$): C, 77.88; H, 7.84; N, 9.08. Found: C, 77.99, 78.25; H, 7.58, 7.33; N, 9.13, 8.91.

EXAMPLE II

(a) Corynanthyl Alcohol

A solution of 15 g. of corynanthine in 150 ml. tetrahydrofuran (dried over $LiAlH_4$) is added dropwise to a cooled suspension of 8 g. $LiAlH_4$ in 250 ml. tetrahydrofuran. After addition the mixture is refluxed for three hours and allowed to stand overnight. The solution is filtered and the filtrate treated with water to destroy the excess reducing agent. The precipitate is filtered off, extracted several times with hot acetone and discarded. The tetrahydrofuran solution and acetone extracts are combined and evaporated in vacuo after being dried over anhydrous sodium sulfate. The residue is recrystallized from ethanol to yield 12.3 g. corynanthyl alcohol, melting point 220–222° C., $[\alpha]_D^{25}=-23°$ (pyridine, c.=0.6, l.=1 dm.).

Analysis.—Calc. ($C_{20}H_{26}N_2O_2$): C, 73.58; H, 8.03; N, 8.58. Found: C, 73.10, 73.29; H, 8.40, 8.49; N, 8.68, 8.58.

(b) Corynanthyl Alcohol Monotosylate

A solution of 3 g. corynanthyl alcohol (dried at 140° C. in vacuo for 4 hours) in 20 ml. dry pyridine is treated with a solution of 3 g. p-toluenesulfonyl chloride in 50 ml. absolute ether at 0°. Flocculent material begins to precipitate and the mixture is concentrated in vacuo at room temperature for thirty minutes. The solution is then kept at 0° C. for one hour and then diluted with several volumes of ether. The precipitated reaction product is triturated in the ether until it becomes completely granular. The ethereal solution is decanted and replaced several times by fresh ether after each trituration. The residue is dried in a desiccator over conc. $H_2SO_4$ in vacuo. The dry powder is dissolved in 20 ml. absolute ethanol and treated with 250 ml. of a cold 0.5% sodium hydroxide solution with vigorous stirring. The insolubles are collected on a filter, washed with water, and dried in a vacuum desiccator over conc. $H_2SO_4$. A yield of 4.3 g. corynanthyl alcohol monotosylate is obtained. Ionophoresis in 5 N acetic acid shows complete conversion of the alcohol to the tosylate.

(c) 16-Methylcorynanthol

A solution of 4.3 g. corynanthyl alcohol monotosylate in 100 ml. tetrahydrofuran (dried over $LiAlH_4$) is added dropwise to a suspension of 2 g. $LiAlH_4$ in 100 ml. tetrahydrofuran (dried over $LiAlH_4$). The mixture is refluxed for five hours, cooled, and the excess reducing agent decomposed by the addition of a minimum amount of water. The solution is filtered and the precipitate is extracted by six 50 ml. portions of tetrahydrofuran. The tetrahydrofuran solutions are combined, dried over anhydrous sodium sulfate and evaporated to dryness in vacuo. The residue in the form of a gum is taken up in a small volume of acetone and precipitated with water. A small portion of the precipitate weighing 0.5 g. is chromatographed over 25 g. alumina (acid washed, dried at 350°) using benzene as solvent. It is developed with 5 successive portions of benzene containing 1, 2, 4, 8 and 10% ethanol, the portions having volumes of 100 ml., 100 ml., 100 ml., 300 ml. and 500 ml., respectively. The last two eluates are combined, evaporated to dryness, the residue dissolved in acetic acid and precipitated by concentrated ammonia, to yield material which can be crystallized from methanol-water. A yield of 0.15 g. of 16-methylcorynanthol is obtained. After recrystallization from methanol-water, the product has a melting point of 164–166° C. and an $[\alpha]_D^{25} = -65°$ (pyridine, c.=0.35, l.=1 dm.).

Analysis.—Calc. ($C_2H_{26}N_2O.\frac{1}{2}H_2O$): C, 75.20; H, 8.52; N, 8.77. Found: C, 75.39; H, 8.72; N, 8.85.

(d) *16α-Methylyohimbone*

A mixture of 0.4 g. 16-methylcorynanthol, 1.8 g. aluminum phenoxide, 10 ml. dry cyclohexanone and 20 ml. dry xylene is refluxed for twenty hours with stirring and under protection from moisture. The reaction mixture is cooled and extracted with a small amount of 10% sodium hydroxide solution. The organic layer is extracted with six 15 ml. portions of 20% acetic acid solution. The combined acid extracts are made basic with ammonia and the precipitated alkaloid is filtered off and washed with water. After drying in a vacuum desiccator the product is recrystallized from acetone. A yield of 0.2 g. 16α-methylyohimbone is obtained. The product has a melting point of 325–326° C. and an $[\alpha]_D^{25} = -101°$ (pyridine, c.=0.4, l.=1 dm.). Elemental analysis is the same as that of 16α-methylyohimbone prepared from 16α-methylepiyohimbol (Example I(d)) and from 16α-methylyohimbol (Example III).

EXAMPLE III

*16α-Methylyohimbone*

A mixture of 5.4 g. of 16α-methylyohimbol, 24.5 g. aluminum phenoxide, 190 ml. dry cyclohexanone, and 180 ml. dry xylene is refluxed for twenty-six hours. Ionophoresis of a sample taken at this time shows complete conversion to the ketone. The reaction mixture is cooled and extracted with 180 ml. of 10% sodium hydroxide solution which is then washed with three 50 ml. portions of xylene. The combined organic solutions are extracted with five 100 ml. portions of 15% acetic acid solutions. The combined acetic acid extracts are made basic with concentrated ammonia to yield a precipitate of the crude ketone weighing 3.75 g., M.P. 300–310° C. Two recrystallizations from acetone yield purified 16α-methylyohimbone, melting point 330–332° C., $[\alpha]_D^{25} = -56°$ (chloroform, c.=0.5, l.=1 dm.), $[\alpha]_D^{25} = -103°$ (pyridine, c.=0.5, l.=1 dm.).

Elemental analysis is the same as that of 16α-methylyohimbone prepared from 16α-methylepiyohimbol (Example I(d)) and from 16-methylcorynanthol (Example II(d)). Mixed melting points with the products of Examples I(d) and II(d) show no depression. The infra-red absorption spectra in Nujol mulls are identical and show strong carbonyl absorption at 1700 reciprocal centimeters.

EXAMPLE IV

*16-Methylepiyohimbol*

To a stirred suspension of 10 g. 16α-methylyohimbone prepared as described in Example III in 500 ml. methanol, 5 g. $KBH_4$ are added in portions at room temperature. After standing overnight the solution is evaporated in vacuo to dryness. The distillation residue is dissolved in 50% acetic acid. The solution is diluted with several volumes of water, filtered and made basic with ammonia. The precipitated alkaloid is collected on a filter, washed with water and dried in a vacuum desiccator over $H_2SO_4$. A yield of 9 g. of a mixture of 16α-methylyohimbol and 16α-methylepiyohimbol is obtained. Fractionation of this mixture by recrystallization from ethanol-acetone yields 3.85 g. purified 16α-methylepiyohimbol, melting point 256–258° C., $[\alpha]_D^{25} = -127°$ (pyridine, c.=1, l.=1 dm.). A mixed melting point with 16α-methylepiyohimbol obtained from β-yohimbyl alcohol monotosylate (Example I(c)) shows no depression.

EXAMPLE V

*16α-Methylyohimbone Hydrochloride*

To a filtered solution of 3.1 g. 16α-methylyohimbone prepared as described in Example III in 200 ml. dichloromethane and 100 ml. absolute ethanol are added 2 ml. 5.5 N HCl in methanol. After a few hours, the precipitated crystals are separated from the mixture by filtration, washed with dichloromethane-ethanol (2:1) and dried in vacuo at 110° C. A yield of 2.8 g. 16α-methylyohimbone hydrochloride is obtained. The product has a melting point of 315–318° C. and an $[\alpha]_D^{25} = -11°$ (dimethylformamide, c.=0.75, l.=1 dm.).

EXAMPLE VI

*16α-Methylyohimbone Citrate*

To a filtered solution of 3.1 g. 16α-methylyohimbone prepared as described in Example III in 200 ml. dichloromethane and 100 ml. absolute ethanol is added a solution of 2.1 g. citric acid monohydrate in 30 ml. ethanol. After a few hours, the precipitated crystals are separated from the mixture by filtration, washed with dichloromethane-ethanol (2:1) and dried in vacuo at 110° C. A yield of 3.2 g. of 16α-methylyohimbone citrate is obtained. The product has a melting point of 302–305° C. and an $[\alpha]_D^{25} = -81°$ (pyridine, c.=0.75, l.=1 dm.).

EXAMPLE VII

*16α-Methylyohimbone Methiodide*

To a filtered solution of 6.2 g. 16α-methylyohimbone prepared as described in Example III in 400 ml. dichloromethane-ethanol (3:1) are added 5 ml. iodomethane. The mixture is allowed to stand overnight at room temperature and is then concentrated to a small volume in vacuo. The precipitated crystals are recovered by filtration, washed with dichloromethane-ethanol (3:1) and dried in vacuo at 110° C. A yield of 6 g. of 16α-methylyohimbone methiodide is obtained. The product has a melting point of 282–285° C. and an $[\alpha]_D^{25} = -14°$ (dimethylformamide, c.=0.8, l.=1 dm.).

EXAMPLE VIII

Solution for injection:
| | |
|---|---|
| 16α-Methylyohimbone hydrochloride ____g__ | 0.5 |
| Water _____ml__ | 100 |

The active ingredient is dissolved in water, filtered and filled into sterile 1 ml. ampules. Each ml. contains 5 mg. active ingredient.

EXAMPLE IX

| Tablets: | Weight, grams |
|---|---|
| 16α-Methylyohimbone | 5 |
| Methyl cellulose, 400 cps. | 3 |
| Lactose | 40 |
| Magnesium stearate | 1.5 |
| Starch | 25.5 |

The powders, except magnesium stearate are granulated with water, passed through No. 16 mesh screen, dried at 50° C., mixed with magnesium stearate and compressed into 75 mg. tablets, each containing 5 mg. active ingredient.

EXAMPLE X

| | Weight, grams |
|---|---|
| 16α-Methylyohimbone | 25 |
| Methylcellulose, 400 cps. | 5 |
| Lactose | 50 |
| Magnesium stearate | 2 |
| Starch | 18 |

100 mg. tablets are formed as in Example IX. Each tablet contains 25 mg. active ingredient.

EXAMPLE XI

Suppositories:                                    Weight, grams
   16α-Methylyohimbone _____ 25
   Cocoa butter _____ 2300

The active ingredient is stirred into molten cocoa butter, poured into chilled molds and allowed to solidify. Each 2.3 g. suppository contains 25 mg. active ingredient.

EXAMPLE XII

Capsules:                                         Weight, grams
   16α-Methylyohimbone _____ 25
   Lactose _____ 416
   Magnesium stearate _____ 9

The powders are separately screened through a No. 40 screen. The lactose and active ingredient are thoroughly mixed, magnesium stearate added and the whole thoroughly mixed. 450 mg. of mixture into No. 1 hard gelatin, two piece capsules. Each capsule contains 25 mg. active ingredient.

EXAMPLE XIII

Suspension for oral use:
   16α-Methylyohimbone (milled powder) _____ 5 g.
   Tragacanth powder, USP _____ 1 g.
   Sodium benzoate _____ 0.4 g.
   Citric acid buffer solution, pH 4.5 __ 50 ml.
   Citric flavor _____ 2 ml.
   F.D.C. dyes _____ Q.s. to color.
   Invert sugar _____ Q.s. to 1000 ml.

The buffer, dyes and flavor are added to 500 ml. invert sugar. A mixture of active ingredient, tragacanth and sodium benzoate is added slowly and additional invert sugar added to volume. The suspension is stirred for two hours, allowed to stand overnight, stirred again for two hours, passed through a piston-type homogenizer and bottled. Each 5 ml. contains 25 mg. of active ingredient.

The effectiveness of the compounds 16α-methylyohimbone, 16α-methylepiyohimbol and 16α-methylyohimbol as analgesics has been investigated.

The procedure best suited to the determination of the analgesic activity of a compound is a modification of that described by E. A. Siegmund et al., J. Pharmacol. & Exper. Therap., 119, 184 (1957). Female mice weighing 18 to 24 grams are used. The "writhing syndrome," which is characterized by periodic twisting of the lower half of the trunk, contractions of the muscles in the pelvic area and extension of the hind legs with elevation of the base of the tail, is produced by the intraperitoneal injection of 0.25 cc. of a 0.02% solution of phenyl-p-quinone in 5% ethyl alcohol. All mice writhe within 10 minutes after administration of phenyl-p-quinone. In carrying out the test, three groups of ten mice each are used. A different dose of the analgesic to be investigated is administered orally to each group. 15 minutes later, each group is challanged with phenylquinone. A dose response curve is obtained by basing observations on an all-or-none response during the 10 minute period after injection of phenylquinone. The amount of the analgesic, expressed as milligrams per kilogram of body weight at which 50% of the test mice show no writhing is determined from the dose response curve and reported as the $ED_{50}$ (effective dose) for the material being studied. This test procedure affords a reliable and convenient method for evaluating the analgesic properties of various compounds. The lower the $ED_{50}$, the more effective the material is as an analgesic.

The $ED_{50}$ for the compounds of the present invention as determined by the above described test procedure are tabulated below.

The table also indicates the acute oral toxicity ($LD_{50}$) of these compounds as determined in mice. The $ED_{50}$ and $LD_{50}$ values for aspirin and codeine are shown for comparative purposes.

TABLE I

| Compound | $LD_{50}$, p.o.-mg./kg. | $ED_{50}$, mg./kg. |
|---|---|---|
| 16α-methylyohimbone | 900 | 12 |
| 16α-methylepiyohimbol | 250 | 45 |
| 16-methylcorynanthol | | 12 |
| Aspirin | 1,000 | 150 |
| Codeine | 240 | 10 |

The analgesic activity of 16α-methylyohimbone has also been evaluated using the Eddy hot foot method and the rat thermal radiation technique. By these two tests 16α-methylyohimbone is found to have an analgesic activity of 11 and 3 times that of codein, respectively.

It is understood that the foregoing detailed description is given merely by way of illustration and that many variations may be made therein without departing from the spirit of our invention.

Having described our invention, what we desire to secure by Letters Patent is:

1. Process for the production of 16α-methylyohimbone by the oxidation of a compound of the group consisting of 16α-methylyohimbol, 16α-methylepiyohimbol and 16-methylcorynanthol, which comprises reacting said compound with an aluminum alkoxide and an aliphatic ketone in an inert aromatic solvent reaction medium under reflux temperature.

2. A method according to claim 1 wherein said aluminum alkoxide is aluminum phenoxide and ketone is cyclohexanone.

3. A therapeutic composition in dosage unit form which consists essentially of pharmaceutical carrier and 2 to 100 milligrams per unit of a member selected from the group consisting of 16α-methylyohimbone and its pharmaceutically acceptable non-toxic acid addition, alkyl halide and alkyl sulfate quaternary ammonium salts.

4. A therapeutic composition in dosage unit form which consists essentially of a pharmaceutical carrier and 2 to 100 milligrams per unit of 16α-methylyohimbone.

References Cited in the file of this patent
FOREIGN PATENTS 1,023,768   Germany _____ Feb. 6, 1958

OTHER REFERENCES

Bose et al., Indian Jour. of Pharm., volume 18, pages 185–189.

Gilman, Organic Chemistry, Wiley, New York (1938), page 367.

Janot et al., Bull. Soc. Chim., Fr. (1949), pages 512 and 514.

Swan, J. Chem. Soc. (London) (1950), pages 1534–1539.

Elderfield et al., Jour. Org. Chem., volume 16 (1951), pages 507–9, 521 and 522.

Karrer et al., Helv. Chim. Acta, volume 35 (1952), pages 1932–1934.

Beilstein, Handbook of Organic Chemistry, volume 24, 2nd supp., page 100 (1954).

Wenkert et al., Jour. Amer. Chem. Soc., volume 80 (April 5, 1958), pages 1615 and 1618.